US012592067B2

(12) United States Patent (10) Patent No.: US 12,592,067 B2
Chien et al. (45) Date of Patent: Mar. 31, 2026

(54) EARLY WARNING METHOD FOR ANTI-COLLISION, VEHICLE MOUNTED DEVICE AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 238 days.

(21) Appl. No.: 18/524,781

(22) Filed: Nov. 30, 2023

(65) Prior Publication Data

US 2025/0118059 A1 Apr. 10, 2025

(30) Foreign Application Priority Data

Oct. 7, 2023 (CN) .......................... 202311287779.5

(51) Int. Cl.
 *G06V 10/80* (2022.01)
 *B60Q 9/00* (2006.01)
 *G06T 7/20* (2017.01)
 *G06T 7/70* (2017.01)
 *G06V 20/56* (2022.01)
 *G06V 20/58* (2022.01)
(52) U.S. Cl.
 CPC .............. *G06V 10/803* (2022.01); *G06T 7/20* (2013.01); *G06T 7/70* (2017.01); *G06V 20/58* (2022.01); *G06V 20/588* (2022.01); *B60Q 9/008* (2013.01); *G06T 2207/10032* (2013.01); *G06T 2207/30256* (2013.01); *G06T 2207/30261* (2013.01)

(58) Field of Classification Search
 CPC .... G06V 10/803; G06V 20/58; G06V 20/588; G06T 7/20; G06T 7/70; G06T 2207/30256; G06T 2207/30261; B60Q 9/008
 See application file for complete search history.

(56) References Cited

U.S. PATENT DOCUMENTS

2016/0163199 A1* 6/2016 Chundrlik, Jr. ........ G08G 1/166
 701/70

FOREIGN PATENT DOCUMENTS

CN 112977370 A * 6/2021 ............ B60W 30/09
CN 114155272 A * 3/2022 ............ G06N 3/045
CN 115991204 4/2023
TW I766647 6/2022
WO WO-2016194900 A1 * 12/2016 ............ G08G 1/166

* cited by examiner

*Primary Examiner* — Ig T An
(74) *Attorney, Agent, or Firm* — ScienBiziP, P.C.

(57) ABSTRACT

An early warning method for anti-collision is provided. In the method, a vehicle-mounted device obtains image information and radar information and determines a main lane line of a road in a driving direction of a vehicle according to the image information. The vehicle-mounted device determines an obstacle located on the main lane line and obtains motion parameters of the vehicle and the obstacle by fusing of the image information and the radar information, and calculates an estimated collision time period from now to the vehicle collides with the obstacle based on the motion parameters, and calculates a braking time period of the vehicle and outputting an early warning in response that the braking time period is less than the estimated collision time period.

18 Claims, 4 Drawing Sheets

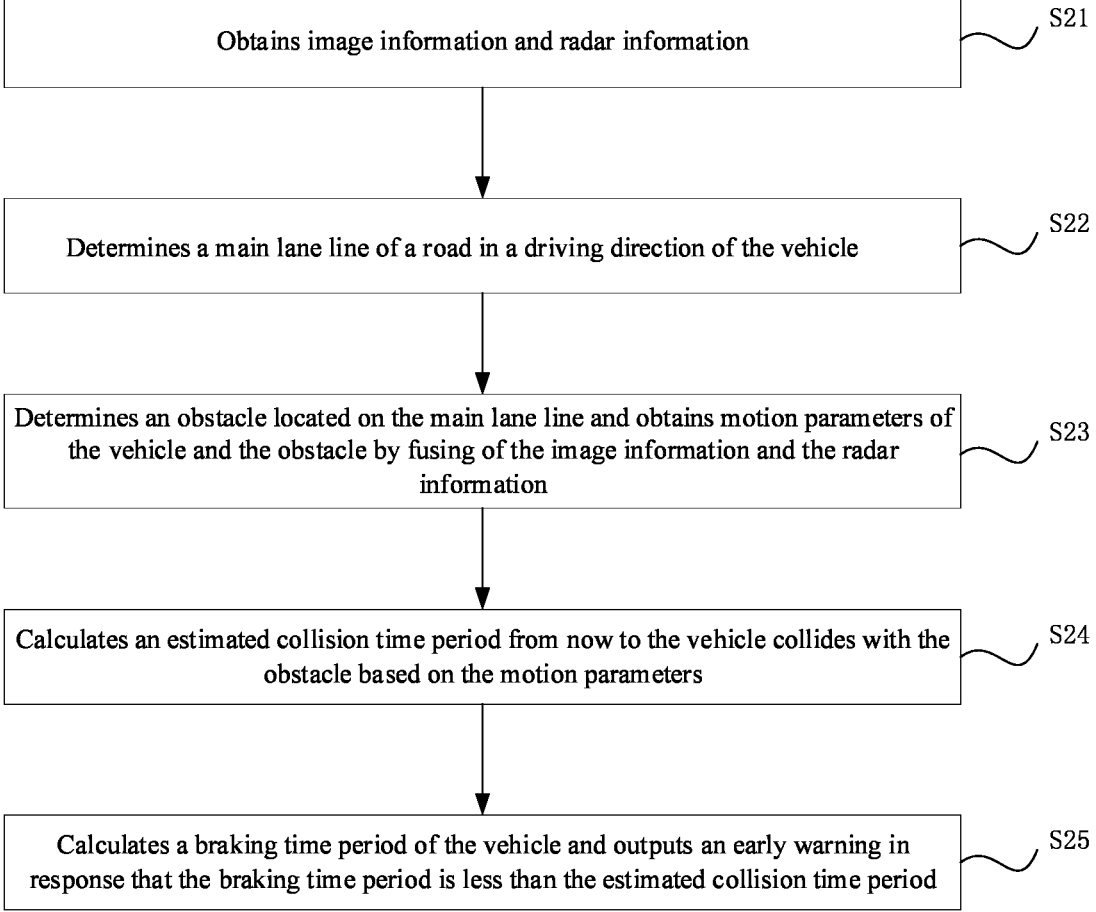

Obtains image information and radar information ⟋ S21

Determines a main lane line of a road in a driving direction of the vehicle ⟋ S22

Determines an obstacle located on the main lane line and obtains motion parameters of the vehicle and the obstacle by fusing of the image information and the radar information ⟋ S23

Calculates an estimated collision time period from now to the vehicle collides with the obstacle based on the motion parameters ⟋ S24

Calculates a braking time period of the vehicle and outputs an early warning in response that the braking time period is less than the estimated collision time period ⟋ S25

FIG.2

EARLY WARNING METHOD FOR ANTI-COLLISION, VEHICLE MOUNTED DEVICE AND STORAGE MEDIUM

FIELD

The present application relates to a field of vehicle technology, in particular to an early warning method for anti-collision, a vehicle-mounted device, and a storage medium.

BACKGROUND

A collision prevention system is an auxiliary system for vehicle driving. It is used to identify obstacles around the vehicle and avoid collisions between the vehicle and the obstacles. However, existing collision prevention systems cannot identify the obstacles accurately when the vehicle is driving on a curve of a road, which is prone to misjudgment, thus causing safety hazards.

BRIEF DESCRIPTION OF THE DRAWINGS

FIG. 2 is a flowchart of an early warning method for anti-collision according to an embodiment of the present application.

DETAILED DESCRIPTION

In order to enable a clearer understanding of objectives, features, and advantages of the present application, the present application is described in detail below in conjunction with accompanying drawings and specific embodiments. It should be noted that the embodiments of the present application and features in the embodiments may be combined with each other without conflict. Many specific details are set forth in the following description in order to facilitate a full understanding of the present application, the described embodiments being only a portion of the embodiments of the present application and not all of them.

It should be noted that "at least one" in the present application refers to one or more, and "multiple" refers to two or more than two. "And/or" describes the association of associated objects, indicating that there can be three relationships. For example, A and/or B can mean A exists alone, or A and B exist simultaneously, or B exists alone. A or B Can be singular or plural. The terms "first", "second", "third", "fourth", etc. (if present) in the description, claims and drawings of present application are used to distinguish similar objects, rather than to describe a specific order or sequence.

In order to better understand the early warning method for anti-collision, vehicle-mounted device and storage medium provided by the embodiments of the present application, an application scenario of the early warning method of the present application is first described below.

Figure 1:
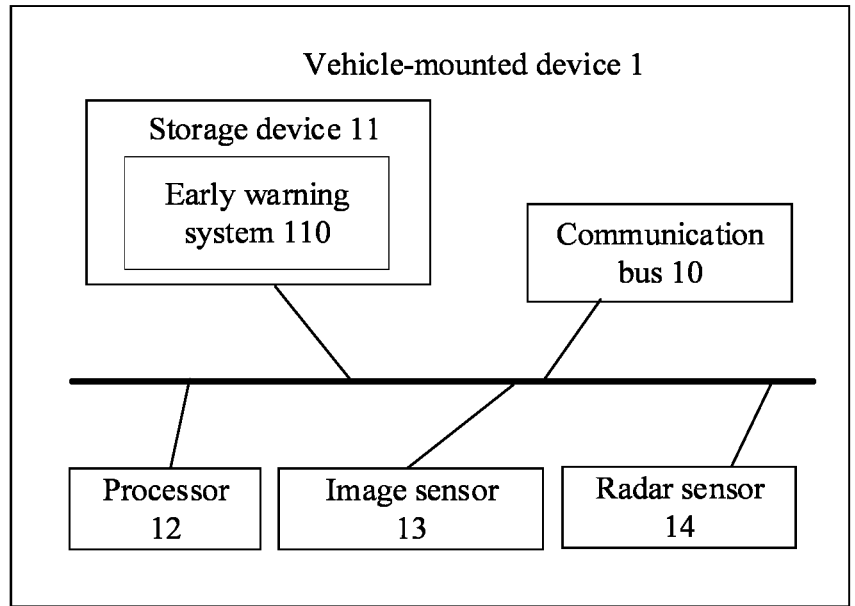
FIG. 1 is a block diagram of a vehicle-mounted device according to an embodiment of the present application.

FIG. 1 is a schematic diagram of a vehicle-mounted device provided by an embodiment of the present application. The early warning method provided by the embodiment of the present application is applied to the vehicle-mounted device 1. The vehicle-mounted device 1 includes, but is not limited to, a storage device 11, at least one processor 12, an image sensor 13 and a radar sensor 14, which are connected to each other through a communication bus 10. The storage device 11 can be used to store an early warning system 110 for anti-collision installed in the vehicle-mounted device 1. The program codes of each program segment in the early warning system 110 can be stored in the storage device 11 of the vehicle-mounted device 1 and executed by at least one processor 12 to realize the function of anti-collision warning.

In at least one embodiment of the present disclose, the image sensor 13 may be an on-board device of the vehicle or a camera device connected to the vehicle, such as a camera, to capture multiple images or videos in front of the vehicle.

In at least one embodiment of the present disclose, the radar sensor 14 may be an on-board device of the vehicle or a radar device externally connected to the vehicle and is used to detect obstacles near the vehicle. The obstacles may be any objects or pedestrians that impedes the movement of the vehicle.

The illustrated in FIG. 1 is merely an example of a vehicle-mounted device 1 and does not constitute a limitation on the vehicle-mounted device 1. In practical applications, the vehicle-mounted device 1 may include more or less components than shown, or some components may be combined, or different components, such as the vehicle-mounted device 1 may also include input and output devices, network access devices, etc.

In an embodiment of the present disclose, the vehicle-mounted device 1 is applied in transportation. For example, the vehicle-mounted device may be a device installed in a vehicle, or a device (e.g., a computer, a laptop, a mobile phone, etc.) separated from the vehicle and is capable of communicating with the vehicle-mounted device and interacting with data to achieve control of the vehicle.

The collision prevention system is an auxiliary system for vehicle driving. It is used to identify obstacles around the vehicle and avoid collisions between the vehicle and the obstacles. However, existing collision prevention systems cannot identify the obstacles accurately when the vehicle is driving on a curve of a road, which is prone to misjudgment, thus causing safety hazards.

In order to solve the problem of inaccurate identification of obstacles during vehicle driving, the embodiment of the present application provides an early warning method for anti-collision, which is applied to the vehicle-mounted device 1 and can improve the accuracy of identification of obstacles during vehicle driving.

As shown in FIG. 2, a flow chart of the early warning method for anti-collision provided in the embodiment of the present application is shown. The early warning method for anti-collision described in the present application is applied to the vehicle-mounted device (such as the vehicle-mounted device 1 of FIG. 1). Depending on the requirements, the sequence of blocks in the flowchart can be changed, and some blocks can be omitted.

Block S21, the vehicle-mounted device obtains image information and radar information.

In one embodiment of the present application, the vehicle-mounted device may be an electronic device equipped in the vehicle, and the vehicle-mounted device may include multiple sensors, for example, image sensors and radar sensors. The vehicle-mounted device may also be coupled to the multiple sensors for data interaction. For example, the image sensor may be a traffic recorder.

In one embodiment of the present application, the image sensor may include a photographic device for acquiring images and/or videos. The photographic device may be a monocular camera. The image sensor may be used for capturing image information, for example, the image sensor obtains a video of front scene of the vehicle and extracts each frame from the video as the image information of the vehicle. The image information may include images captured by the image sensor. The image information may include an image of the vehicle surrounding the vehicle or a foreground image of the front scene of the vehicle. The front scene of the vehicle includes a main lane line of a road which the vehicle is on. The image information includes the main lane line of the road.

In one embodiment of the present application, the radar sensor can use radio to find a target and determine a spatial position of the target. The target can be an object around the vehicle or a pedestrian. During the driving of the vehicle, the radar sensor is used to obtain radar information around the vehicle, and the radar information can include the object around the vehicle or the pedestrian.

The radar sensor can use radio to find the target and determine the spatial position of the target. The target can be an object around the vehicle or a pedestrian. During the driving of the vehicle, the radar sensor is used to obtain radar information around the vehicle, and the radar information can be an object around the vehicle or a pedestrian.

Block S22, the vehicle-mounted device determines a main lane line of a road in a driving direction of the vehicle.

In one embodiment of the present application, the image sensor can be used to acquire the image information in front of the vehicle. The image information can be a foreground image in front of the vehicle. The foreground image is usually a distorted image, and the vehicle-mounted device obtains a corrected image by performing a distortion correction of the foreground image.

In one embodiment of the present application, the vehicle-mounted device establishes an image coordinate system corresponding to the foreground image and obtains a coordinate with a certain distortion corresponding to each non-zero pixel point of the foreground image. The vehicle-mounted device acquires multiple internal references of the photographic device for shooting the foreground image, and obtains a non-distortion coordinate corresponding to each non-zero pixel point of the foreground image according to the coordinate with certain distortion and the multiple internal references. The multiple internal references are used for determining a distortion degree of the coordinate with the certain distortion.

In one embodiment of the present application, in order to improve smoothness of the corrected image, the vehicle-mounted device obtains weights corresponding to the coordinates with certain distortion and the coordinates without distortion respectively and corrects the coordinates with certain distortion smoothly by using a weighting method to ensure an authenticity of the image.

In one embodiment of the present application, after obtaining the corrected image, the vehicle-mounted device performs preprocessing on the corrected image according to an image grayscale, a gradient threshold, a color threshold, and a saturation threshold. The vehicle-mounted device obtains a bird's eye view (BEV) image according to the corrected image by removing information irrelevant to the lane lines in the corrected image to obtain a binary image, and performing perspective transformation on the binary image. The BEV image refers to a three-dimensional view drawn by using the high viewpoint method to look down at the ground undulations from a high point based on the principle of perspective. It is more realistic than a plan view.

In one embodiment of the present application, the vehicle-mounted device obtains the BEV image by using approximately parallel characteristics of lane lines on the road and using perspective transformation to eliminate the perspective effect. In detail, the vehicle-mounted device sets each non-zero pixel point of the corrected image as a target point and obtains an inverse transformation matrix by calculating a coordinate point of the target point by using a coordinate conversion formula, and obtains the BEV image according to the inverse transformation matrix.

At least one embodiment, after the vehicle-mounted device converts the foreground image into the BEV image, the vehicle-mounted device searches the lane lines by moving a sliding window on the BEV image. Since the lane lines are continuous, the vehicle-mounted device can process pixels of the lower half of the BEV image by histogram statistics technology and the vehicle-mounted device determines that a pixel point corresponding to the maximum value to be an intersection of the lane line and the bottom of the upper half of the BEV image, and the vehicle-mounted device searches the lane lines from bottom to top according to the intersection by using a sliding window. The vehicle-mounted device counts the pixels whose gray value is not 0 in the sliding window for each sliding window. If the number of currently counted non-zero pixels is greater than a preset threshold, it is determined that the vehicle-mounted device searched a lane line successfully. For example, the vehicle-mounted device moves the sliding window with a distance equal to a width of 200 pixels each time. A center position of the next sliding window is determined by an average of the abscissas of all non-zero pixels in the current window. If the number of non-zero pixels currently counted is less than the preset threshold, it indicates that the lane line may be curved and is about to exceed a range of the current sliding window, or the current sliding window is at the interval between the dotted lanes. At this time, the vehicle-mounted device selects an average value of the abscissas corresponding to all pixels in N previous sliding windows as the center position of the next sliding window, thereby ensuring that the sliding window can move with changes in the lane. During the movement of the sliding window, a least squares method is used to fit the pixels in the sliding window to determine a main lane line, which can include a left main lane line and a right main lane line.

Block S23, the vehicle-mounted device determines an obstacle located on the main lane line and obtains motion parameters of the vehicle and the obstacle by fusing of the image information and the radar information.

In order to determine whether there is an obstacle between the left main lane line and the right main lane line, the image information obtained by the image sensor and the radar information obtained by the radar sensor are fused.

Specifically, the vehicle-mounted device locates the obstacle through the radar sensor. First, a world coordinate system corresponding to the radar information obtained by the radar sensor, and the world coordinate $(X_w, Y_w, Z_w)$ of the obstacle in the world coordinate system. A relationship between the image coordinate system and the world coordinate system is determined by the external parameter matrix of the radar sensor and the image sensor, as shown below:

$$\begin{bmatrix} X_c \\ Y_c \\ Z_c \\ 1 \end{bmatrix} = \begin{bmatrix} R & T \\ 0 & 1 \end{bmatrix} \begin{bmatrix} X_w \\ Y_w \\ Z_w \\ 1 \end{bmatrix},$$

$(X_c, Y_c, Z_c)$ is a coordinate corresponding to the world coordinate in the image coordinate system, $$\begin{bmatrix} R & T \\ 0 & 1 \end{bmatrix}$$

refers to the external parameter matrix of the radar sensor and image sensor.

In one embodiment of the present application, the vehicle-mounted device converts the world coordinate corresponding to the obstacle into a pixel coordinate on the image coordinate system as shown below according to the relationship between the image coordinate system and the world coordinate system, the external parameter matrix of the radar sensor and the image sensor $$\begin{bmatrix} R & T \\ 0 & 1 \end{bmatrix},$$

and an internal parameter K of the image sensor:

$$Z_c \begin{bmatrix} u \\ v \\ 1 \end{bmatrix} = K \begin{bmatrix} R & T \\ 0 & 1 \end{bmatrix} \begin{bmatrix} X_w \\ Y_w \\ Z_w \\ 1 \end{bmatrix}.$$

[u, v, 1] represents a conversion of obstacle into a two-dimensional pixel coordinate in image coordinate system.

In one embodiment of the present application, after converting the world coordinates of the obstacle into pixel coordinates, the inverse perspective transformation matrix is used to convert the pixel coordinate into a coordinate on the image coordinate system, which can fuse the image information and the radar information.

In one embodiment of the present application, after fusing the image information and the radar information, the vehicle-mounted device determines whether there is an obstacle in the main lane line based on the coordinates of the obstacle on the image coordinate system corresponding to the BEV image and an expression corresponding to the curve fitted to the main lane line. The expression corresponding to the curve fitted by the lane line includes a quadratic equation fL(x) fitted by the left lane line and a quadratic equation fR(x) fitted by the right lane line.

Figure 3:
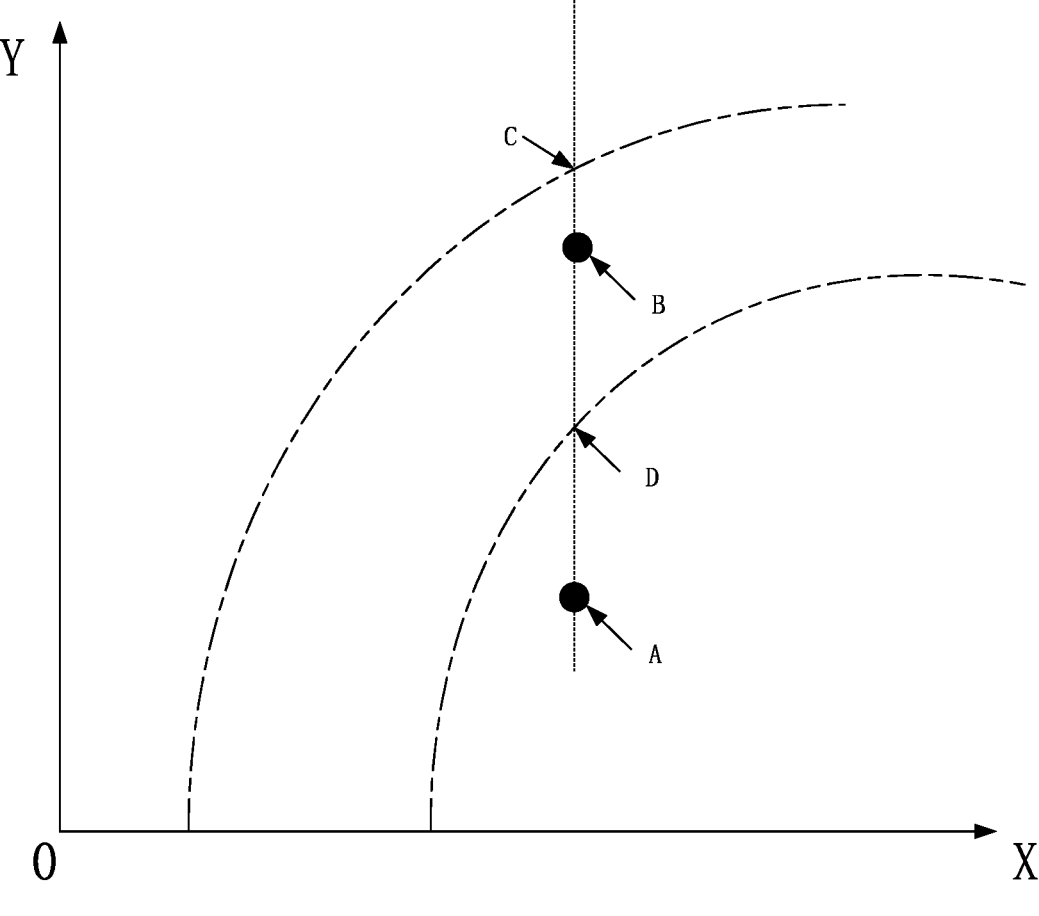
FIG. 3 is a coordinate sketch-map of a curved lane line and obstacles according to an embodiment of the present application.

FIG. 3 is a coordinate sketch-map of a curved lane line and obstacles according to an embodiment of the present application.

In one embodiment of the present application, as shown in FIG. 3, assume that the vehicle is driving on a curve, the vehicle-mounted determines whether a position of a point A of a first obstacle and a position of a point B of a second obstacle are within the main lane line, and obtains point C on the left main lane by substituting the coordinates of point A into the quadratic equation fL(x) and obtains point D on the right main lane by substituting the coordinates of point B into the quadratic equation fR(x). Then point C is located on a connection line between point A and point B and on the left main lane. point, the point D is located on a connection line between point A and point B and on the right main lane line. Based on the positions of point A, point B, point C and point D, the vehicle-mounted determines whether the obstacle is within the main lane line.

The vehicle-mounted determines that the obstacle is within the main lane line in response that the obstacle is on a connection line between point C and point D, such as point B in FIG. 3. The vehicle-mounted determines that the obstacle is not within the main lane line in response that the obstacle is not on a connection line between point C and point D, such as point A in FIG. 3, which does not affect the vehicle's driving on the main lane line.

Figure 4:
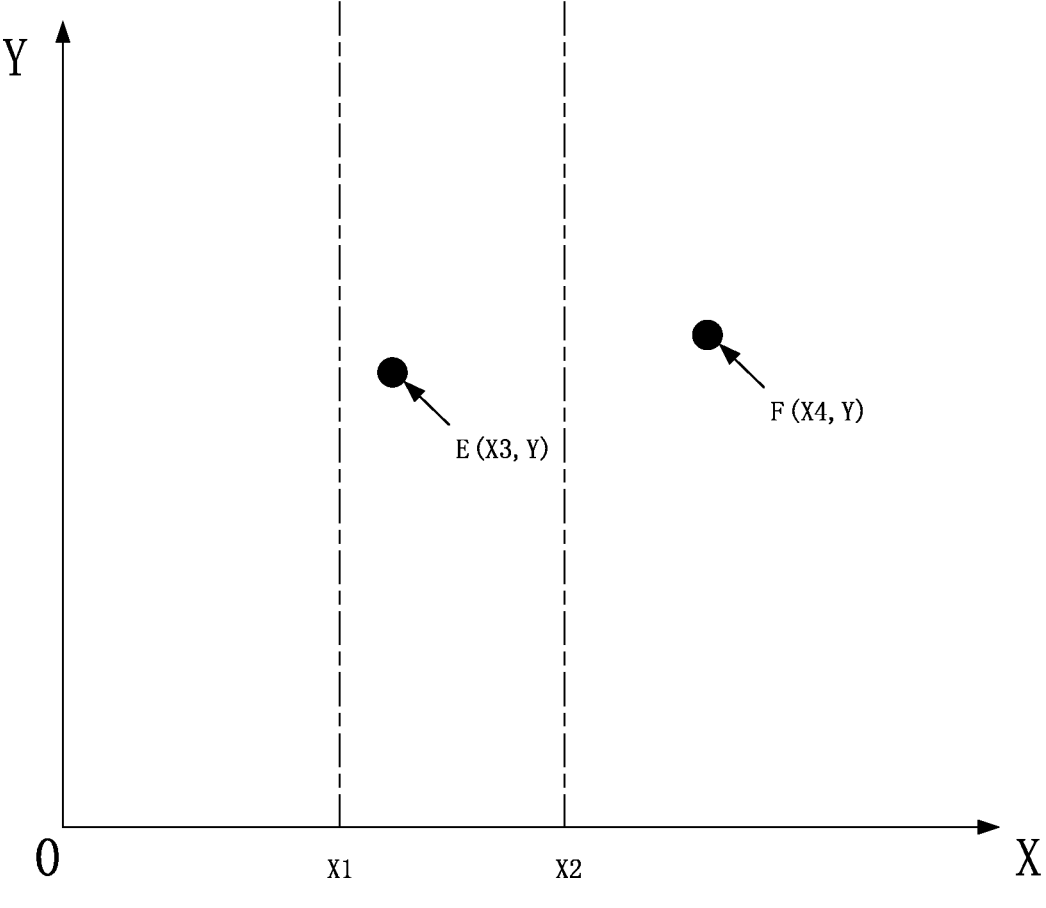
FIG. 4 is a coordinate sketch-map of a straight lane line and obstacles according to an embodiment of the present application.

FIG. 4 is a coordinate sketch-map of a straight lane line and obstacles according to an embodiment of the present application.

In one embodiment of the present application, as shown in FIG. 4, assuming that the vehicle is traveling in a straight line, the vehicle-mounted device determines whether the obstacle is located on the main lane line according to an abscissa coordinate of the obstacle in the image coordinate system and an abscissa coordinate of the main lane line. As shown in FIG. 4, assuming that the abscissa coordinate of the left lane line is X1, and X1 is equal to 18, the abscissa coordinate of the right lane line is X2, and X2 is equal to 24. And if the abscissa coordinate of the obstacle E is X3, and X3 is equal to 30. Since X2>X3>X1, the vehicle-mounted device determines that the obstacle E is located within the main lane line. And if the abscissa coordinate of the obstacle F is X4, and X4 is equal to 40. Since X4>X2>X1, the vehicle-mounted device determines that the obstacle F is not located within the main lane line is located on the right side of the right lane line.

After determining that there are obstacles in the main lane line, in order to avoid impact of the obstacle to the driving vehicle, the vehicle-mounted device obtains the motion parameters of the vehicle and the obstacle.

Based on the fused image information and radar information, the vehicle-mounted device determines a relative distance and a relative speed between the vehicle and the obstacle and predicts a forward distance of the obstacle based on the image information and the relative speed.

In one embodiment of the present application, the vehicle-mounted device predicts the forward distance of the obstacle based on the image information and relative speed includes obtains a time interval between taking two adjacent images and calculates two relative speeds of the obstacle corresponding to the two adjacent images, and calculates an acceleration of the obstacle according to the time interval and the two relative speeds, and predicts the forward distance of the obstacle based on the two relative speeds and the acceleration. When a frame rate is 30 frames per second, the time interval is t second, and t=1/30 second. Assuming that the obstacle is moving at a constant speed, the radar sensor is used to obtain a relative speed corresponding to a first shot of the two adjacent images, recorded as v1, and a relative speed corresponding to a second shot of the two adjacent images is recorded as v2. The relative speed refers to the speed obtained by the radar sensor during the photograph apparatus shooting images. The vehicle-mounted device calculates the acceleration of the obstacle based on the time interval and the two recorded relative speed. For example, through a formula v2=v1+at, the acceleration a of the obstacle can be calculated. After obtaining the acceleration a of the obstacle, the forward distance S of the obstacle can be calculated according to a formula $S=v_0t+at^2/2$, where v0 represents an initial speed of the obstacle within the time interval. The method of calculating the forward distance is not limited here. For example, the forward distance can be calculated using the initial velocity and a final velocity within the time interval.

Based on the fused image information and radar information, the present application determines whether there are obstacles within the main lane line, avoiding misjudgment of pedestrians or objects outside the main lane line. After determining that there are obstacles in the main lane line, the motion parameters of the vehicle and obstacles are obtained in order to calculate the relevant information of the vehicle and obstacles and improve the vehicle's early warning capability and efficiency.

Block S24, the vehicle-mounted device calculates an estimated collision time period from now to the vehicle collides with the obstacle based on the motion parameters.

In order to determine the impact of the obstacle located at the main lane line for the driving vehicle, it is necessary to calculate the estimated collision time period from now to the vehicle collides with the obstacle. The estimated collision time refers to the period from now to the vehicle collides with the obstacle after the vehicle-mounted device discovers the obstacle during the vehicle is driving.

In one embodiment, the vehicle-mounted device calculates the estimated collision time period from now to the vehicle collides with the obstacle based on the motion parameters. The motion parameters include a relative distance, a forward distance and a relative speed. For example, t the vehicle-mounted device calculates the estimated collision time period by a formula TTC=(the relative distance+ the forward distance)/the relative speed.

Block S25, the vehicle-mounted device calculates a braking time period of the vehicle and outputs an early warning in response that the braking time period is less than the estimated collision time period.

After calculating the estimated collision time period TTC, the vehicle-mounted device obtains a driving speed of the vehicle based on the radar information and calculates a braking distance based on the driving speed of the vehicle and a gravity acceleration. Then the vehicle-mounted device calculates the braking time period based on the braking distance and the driving speed. The braking time period refers to when the driver applies the brakes until the vehicle stops. The braking time period also refers to a minimum time period the vehicle is expected to collide the obstacle. For example, braking time period TTCmin=the braking distance/the relative speed, and the braking distance=(the driving speed*the driving speed)/(2*0.9*g), where g is the acceleration of gravity.

The vehicle-mounted device compares the estimated collision time period TTC with the braking time period TTCmin. If the estimated collision time period TTC is less than the braking time period TTCmin, the vehicle-mounted device determines that the vehicle will hit the obstacle before the vehicle completely stopped after braking. Then, the vehicle-mounted device outputs an early warning message to allow the driver changes the direction of travel or take first aid measures. If the estimated collision time period TTC is less than the braking time period TTCmin, the vehicle-mounted device determines that the obstacle is within a safe distance from the vehicle.

The early warning method for anti-collision provided by the present application, in order to improve the accuracy of identifying the obstacle while the vehicle is driving. The vehicle-mounted device determines the main lane line of the road in the driving direction of the vehicle based on the image information and determines at least one obstacle within the main lane line and obtains motion parameters of the vehicle and the obstacle by fusing of the image information and the radar information. Finally, the vehicle-mounted device calculates an estimated collision time period from now to the vehicle collides with the obstacle based on the motion parameters. If the estimated collision time period TTC is less than the braking time period TTCmin, the vehicle-mounted device outputs the early warning message. The present application can improve the accuracy of anti-collision warning, and can also avoid misjudgment of obstacles that are not located on the main lane line, but the vehicle-mounted device while frequently remind the driver, which will affect the driving experience.

Referring to FIG. 1, in this embodiment, the storage device 11 may be an internal memory of the vehicle-mounted device 1, i.e., the storage device 11 is embedded in the vehicle-mounted device 1. In other embodiments, the storage device 11 may also be an external memory of the vehicle-mounted device 1, i.e., the storage device 11 is external connected to the vehicle-mounted device 1.

In some embodiments, the vehicle-mounted device 1 includes a terminal that can automatically perform numerical calculations and/or information processing according to preset or stored instructions. Hardware of the vehicle-mounted device 1 includes but is not limited to a microprocessor, an application-specific integrated circuit, a programmable gate array, a digital processor and an embedded device, etc.

It should be noted that the vehicle-mounted device 1 is only an example. If other existing or future electronic products can be adapted to the present application, they should also be included in the protection scope of the present application and be included here by reference.

In some embodiments, the storage device is used to store program codes and various data. For example, the storage device can be used to store the storage device installed in the vehicle-mounted device 1 and realize high-speed and automatic access to programs or data during the operation of the vehicle-mounted device 1. The storage device includes read-only memory (Read-Only Memory, ROM), programmable read-only memory (Programmable Read-Only Memory, PROM), and erasable programmable read-only memory (Erasable Programmable Read-Only Memory, EPROM), One-time Programmable Read-Only Memory (OTPROM), Electronically Erasable Programmable Read-Only Memory (EEPROM), Compact Disc Read-Only Memory (CD-ROM) or other optical disk storage, magnetic disk storage, magnetic tape storage, or any other computer-readable storage medium that can be used to carry or store data.

In some embodiments, the at least one processor 12 may be composed of an integrated circuit, for example, it may be composed of a single packaged integrated circuit, or it may be composed of multiple integrated circuits packaged with the same function or different functions, including one or a combination of multiple central processing units (CPUs), microprocessors, digital processing chips, graphics processors and various control chips. The at least one processor 12 is the control core (Control Unit) of the vehicle-mounted device 1 and uses various interfaces and lines to connect various components of the entire vehicle-mounted device 1 by running or executing programs stored in the storage device or module, and calls the data stored in the storage device to perform various functions of the vehicle-mounted device 1 and process data, for example, perform the anti-collision warning function shown in FIG. 1.

In some embodiments, an early warning system 110 executes in the vehicle-mounted device 1. The early warning system 110 may include a plurality of functional modules composed of program code segments. The program codes of each program segment in the early warning system 110 can be stored in the storage device 11 of the vehicle-mounted device 1 and executed by at least one processor 12 to implement the anti-collision warning function shown in FIG. 1.

In this embodiment, the early warning system 110 can be divided into multiple functional modules according to the functions it performs. The module referred to in the present application refers to a series of computer program segments that can be executed by at least one processor and can complete a fixed function, which are stored in the memory.

Although not shown, the vehicle-mounted device 1 may also include a power supply (such as a battery) that supplies power to various components. Preferably, the power supply may be logically connected to the at least one processor 12 through a power management device, so that the power supply can be implemented through the power management device. Manage functions such as charging, discharging, and power consumption management. The power supply may also include one or more DC or AC power supplies, recharging devices, power failure test circuits, power converters or inverters, power status indicators and other arbitrary components. The vehicle-mounted device 1 may also include a variety of sensors, Bluetooth modules, Wi-Fi modules, etc., which will not be described again here.

It should be understood that the above embodiments are for illustration only, and the scope of the present application is not limited by this structure.

The above-mentioned integrated units implemented in the form of software function modules can be stored in a computer-readable storage medium. The above-mentioned software function module is stored in a storage medium and includes lots of instructions to cause a vehicle-mounted device (which can be a server, a personal computer, etc.) or a processor to execute part of the method described in various embodiments of the present application.

In at least one embodiment, the program codes are stored in the storage device 1, and the at least one processor 12 can call the program codes stored in the storage device 11 to perform related functions. The program code stored in the storage device 11 can be executed by the at least one processor 12 to implement the functions of each module to achieve the purpose of the early warning for anti-collision.

In the several embodiments provided in the present application, it should be understood that the disclosed devices and methods can be implemented in other ways. For example, the device embodiments described above are only illustrative. For example, the division of modules is only a logical function division, and there may be other division methods in actual implementation.

The modules described as separate components may or may not be physically separated, and the components shown as modules may or may not be physical units, that is, they may be located in one place, or they may be distributed to multiple network units. Some or all the modules can be selected according to actual needs to achieve the purpose of the solution of this embodiment.

In addition, each functional module in various embodiments of the present application can be integrated into one processing unit, or each unit can exist physically alone, or two or more units can be integrated into one unit. The above-mentioned integrated unit can be implemented in the form of hardware or in the form of hardware plus software function modules.

It is obvious to those skilled in the art that the present application is not limited to the details of the above-described exemplary embodiments, and that the present application can be implemented in other specific forms without departing from the spirit or essential characteristics of the present application. Therefore, the embodiments should be regarded as illustrative and non-restrictive from any point of view, and the scope of the application is defined by the appended claims rather than the above description, and it is therefore intended that all claims falling within the claims. All changes within the meaning and scope of the equivalent elements are included in the present application. Any reference signs in the claims shall not be construed as limiting the claim in question. Furthermore, it is obvious that the word "including" does not exclude other elements or the singular does not exclude the plural. Multiple units or means stated in a device claim can also be implemented by one unit or means by software or hardware. Words such as first and second are used to indicate names and do not indicate any specific order.

Finally, it should be noted that the above embodiments are only used to illustrate the technical solutions of the present application and are not limiting. Although the present application has been described in detail with reference to the above preferred embodiments, those of ordinary skill in the art will understand that the technical solutions of the present application can be modified. The technical solution may be modified or equivalently substituted without departing from the spirit and scope of the technical solution of the present application.

What is claimed is:

1. An early warning method for anti-collision, the method comprising:

obtaining image information and radar information;

converting the image information into a bird's eye view (BEV) image;

determining a main lane line of a road in a driving direction of a vehicle according to the image information;

determining an obstacle located on the main lane line and obtaining motion parameters of the vehicle and the obstacle by fusing of the image information and the radar information, wherein fusing of the image information and the radar information further comprises: establishing an image coordinate system based on the BEV image; determining a world coordinate system according to the radar information obtained by a radar sensor, and determining a world coordinate of the obstacle in the world coordinate system; converting the world coordinate of the obstacle in the world coordinate system to a pixel coordinate on the image coordinate system according to an external parameter matrix of the radar sensor and the image sensor, and an internal parameter of the image sensor; and converting the pixel coordinate into a coordinate on the image coordinate system by using an inverse perspective transformation matrix;

calculating an estimated collision time period from now to the vehicle collides with the obstacle based on the motion parameters; and calculating a braking time period of the vehicle and outputting an early warning in response that the braking time period is less than the estimated collision time period.

2. The method according to claim 1, wherein obtaining the motion parameters of the vehicle and the obstacle by fusing of the image information and the radar information further comprises:

determining a relative distance and a relative speed between the vehicle and the obstacle; and predicting a forward distance of the obstacle based on the image information and the relative speed.

3. The method according to claim 2, wherein predicting the forward distance of the obstacle based on the image information and the relative speed further comprises:

obtaining a time interval between taking two adjacent images;

calculating two relative speeds of the obstacle corresponding to the two adjacent images;

calculating an acceleration of the obstacle according to the time interval and the two relative speeds; and predicting the forward distance of the obstacle based on the two relative speeds and the acceleration.

4. The method according to claim 3, wherein calculating the estimated collision time period from now to the vehicle collides with the obstacle based on the motion parameters further comprises:

calculating the estimated collision time period according to the relative distance, the forward distance, and the two relative speeds.

5. The method according to claim 2, wherein calculating the braking time period of the vehicle further comprises:

obtaining a driving speed of the vehicle based on the radar information;

calculating the braking distance based on the driving speed of the vehicle and a gravity acceleration; and calculating the braking time period based on the braking distance and the driving speed.

6. The method according to claim 1, wherein determining the main lane line of the road in the driving direction of the vehicle according to the image information further comprises:

determining the main lane line by fitting a plurality of pixels in a sliding window on the BEV image through a least squares method when moving the sliding window on the BEV image.

7. A vehicle-mounted device comprising:

a storage device;

at least one processor, wherein the storage device stores one or more programs, which when executed by the at least one processor, cause the at least one processor to:

obtain image information and radar information;

convert the image information into a bird's eye view (BEV) image;

determine a main lane line of a road in a driving direction of a vehicle according to the image information;

determine an obstacle located on the main lane line and obtain motion parameters of the vehicle and the obstacle by fusing of the image information and the radar information, comprises: establish an image coordinate system based on the BEV image; determine a world coordinate system according to the radar information obtained by a radar sensor, and determine a world coordinate of the obstacle in the world coordinate system; convert the world coordinate of the obstacle in the world coordinate system to a pixel coordinate on the image coordinate system according to an external parameter matrix of the radar sensor and the image sensor, and an internal parameter of the image sensor; and convert the pixel coordinate into a coordinate on the image coordinate system by using an inverse perspective transformation matrix;

calculate an estimated collision time period from now to the vehicle collides with the obstacle based on the motion parameters; and calculate a braking time period of the vehicle and output an early warning in response that the braking time period is less than the estimated collision time period.

8. The vehicle-mounted device according to claim 7, wherein the at least one processor obtains the motion parameters of the vehicle and the obstacle by fusing of the image information and the radar information by:

determining a relative distance and a relative speed between the vehicle and the obstacle; and predicting a forward distance of the obstacle based on the image information and the relative speed.

9. The vehicle-mounted according to claim 8, wherein the at least one processor predicts the forward distance of the obstacle based on the image information and the relative speed by:

obtaining a time interval between taking two adjacent images;

calculating two relative speeds of the obstacle corresponding to the two adjacent images;

calculating an acceleration of the obstacle according to the time interval and the two relative speeds; and predicting the forward distance of the obstacle based on the two relative speeds and the acceleration.

10. The vehicle-mounted according to claim 9, wherein the at least one processor calculates the estimated collision time period from now to the vehicle collides with the obstacle based on the motion parameters by:

calculating the estimated collision time period according to the relative distance, the forward distance, and the two relative speeds.

11. The vehicle-mounted according to claim 8, wherein the at least one processor calculates the braking time period of the vehicle by:

obtaining a driving speed of the vehicle based on the radar information;

calculating the braking distance based on the driving speed of the vehicle and a gravity acceleration; and calculating the braking time period based on the braking distance and the driving speed.

12. The vehicle-mounted according to claim 7, wherein the at least one processor determines the main lane line of the road in the driving direction of the vehicle according to the image information by:

determining the main lane line by fitting a plurality of pixels in a sliding window on the BEV image through a least squares method when moving the sliding window on the BEV image.

13. A non-transitory storage medium having instructions stored thereon, when the instructions are executed by a processor of a vehicle-mounted device, the processor is caused to perform an early warning method for anti-collision, wherein the method comprises:

obtaining image information and radar information;

converting the image information into a bird's eye view (BEV) image;

determining a main lane line of a road in a driving direction of a vehicle according to the image information;

determining an obstacle located on the main lane line and obtaining motion parameters of the vehicle and the obstacle by fusing of the image information and the radar information, wherein fusing of the image information and the radar information further comprises: establishing an image coordinate system based on the BEV image; determining a world coordinate system according to the radar information obtained by a radar sensor, and determining a world coordinate of the obstacle in the world coordinate system; converting the world coordinate of the obstacle in the world coordinate system to a pixel coordinate on the image coordinate system according to an external parameter matrix of the radar sensor and the image sensor, and an internal parameter of the image sensor; and converting the pixel coordinate into a coordinate on the image coordinate system by using an inverse perspective transformation matrix;

calculating an estimated collision time period from now to the vehicle collides with the obstacle based on the motion parameters; and calculating a braking time period of the vehicle and outputting an early warning in response that the braking time period is less than the estimated collision time period.

14. The non-transitory storage medium according to claim 13, wherein obtaining the motion parameters of the vehicle and the obstacle by fusing of the image information and the radar information further comprises:

determining a relative distance and a relative speed between the vehicle and the obstacle; and predicting a forward distance of the obstacle based on the image information and the relative speed.

15. The non-transitory storage medium according to claim 14, wherein predicting the forward distance of the obstacle based on the image information and the relative speed further comprises:

obtaining a time interval between taking two adjacent images;

calculating two relative speeds of the obstacle corresponding to the two adjacent images;

calculating an acceleration of the obstacle according to the time interval and the two relative speeds; and predicting the forward distance of the obstacle based on the two relative speeds and the acceleration.

16. The non-transitory storage medium according to claim 15, wherein calculating the estimated collision time period from now to the vehicle collides with the obstacle based on the motion parameters further comprises:

calculating the estimated collision time period according to the relative distance, the forward distance, and the two relative speeds.

17. The non-transitory storage medium according to claim 14, wherein calculating the braking time period of the vehicle further comprises:

obtaining a driving speed of the vehicle based on the radar information;

calculating the braking distance based on the driving speed of the vehicle and a gravity acceleration; and calculating the braking time period based on the braking distance and the driving speed.

18. The non-transitory storage medium according to claim 13, wherein determining the main lane line of the road in the driving direction of the vehicle according to the image information further comprises:

determining the main lane line by fitting a plurality of pixels in a sliding window on the BEV image through a least squares method when moving the sliding window on the BEV image.

* * * * *